United States Patent [19]

Dunne

[11] 4,140,953
[45] Feb. 20, 1979

[54] REAL TIME PROGRAM MODIFICATION APPARATUS

[75] Inventor: Maurice J. Dunne, Newtown, Conn.

[73] Assignee: Unimation, Inc., Danbury, Conn.

[21] Appl. No.: 663,481

[22] Filed: Mar. 3, 1976

[51] Int. Cl.$^2$ ............................................. G05B 19/42
[52] U.S. Cl. ................................... 318/568; 318/571; 318/632
[58] Field of Search ....................... 318/568, 571, 632

[56] References Cited

U.S. PATENT DOCUMENTS

| | | | |
|---|---|---|---|
| 3,551,656 | 12/1970 | Wohlfeil | 318/572 X |
| 3,555,254 | 1/1971 | Gerber | 318/632 X |
| 3,701,888 | 10/1972 | McDaniel | 318/562 UX |
| 3,725,654 | 4/1973 | Tripp | 318/632 X |
| 3,766,460 | 10/1973 | Hentz et al. | 318/571 |
| 3,770,947 | 11/1973 | Deily | 318/572 |
| 3,885,207 | 5/1975 | DuBosque et al. | 318/568 |
| 3,906,323 | 9/1975 | Ono et al. | 318/632 X |
| 4,025,838 | 5/1977 | Watanabe | 318/568 |

Primary Examiner—B. Dobeck
Attorney, Agent, or Firm—Mason, Kolehmainen, Rathburn & Wyss

[57] ABSTRACT

A programmable manipulator apparatus employs a memory for storing digital representations corresponding to different positions of the programmable manipulator in a number of different axes. The manipulator apparatus includes encoders for developing position signals representing the position of the manipulator in each of the axes. During repetitive work cycles, the stored digital signals in the memory are utilized as command signals and are compared with the encoder signals to move the manipulator to each set of positions in sequence corresponding to the various recorded positions as they appear in the memory. A program modification apparatus is provided to modify or correct certain manipulative positions of various sequence steps during the repetitive work cycles. The operator selects the program steps to be modified along with the desired positional modifications of the manipulator both as to magnitude and direction in the various axes as determined by his observations and/or results of the work cycle.

38 Claims, 8 Drawing Figures

REAL TIME PROGRAM MODIFICATION APPARATUS

CROSS-REFERENCE TO RELATED APPLICATIONS

The present application is related to copending application Ser. No. 625,932 filed by J. F. Engelberger, et al. on Oct. 28, 1975, which discloses a programmable manipulator apparatus and is hereby incorporated by reference for all purposes.

BACKGROUND OF THE INVENTION

A. Field of the Invention

The present invention relates to manipulator apparatus and more particularly to a programmable automatic manipulator system which may be programmed to perform a desired series of operations in succession during repetitive work cycles. The program may be modified during the work cycles by an operator to correct or adjust certain positional steps and operations.

B. Description of the Prior Art

Programmable manipulators have been employed in various industries for some time to transport articles from one location to another and to perform certain pattern operations such as welding, paint spraying or the like. Such programmable manipulators are shown, for example, in Devol U.S. Pat. No. 3,306,471 dated Feb. 28, 1967; Devol U.S. Pat. No. 3,543,947 dated Dec. 1, 1970; Dunne, et al. U.S. Pat. No. 3,661,051 dated May 9, 1972; Engelberger, et al. U.S. Pat. No. 3,744,032 dated July 3, 1973; Engelberger, et al. U.S. Pat. No. 3,885,295 dated May 27, 1975; Devol, et al. U.S. Pat. No. 3,890,552 dated June 17, 1975; British Pat. No. 781,465 and copending application Ser. No. 625,932 cross-referenced above. While these programmable manipulators are generally suitable for their intended purpose, the various devices are not capable of modifying their stored programs during operation such as during a work cycle.

In some applications, the manipulator is programmed for movement to follow a work piece on a moving conveyor and executes a predetermined pattern of operations such as welding, for example, on each work piece as it moves past the manipulator station. In other applications, the manipulator may perform similar patterns of operations or repetitive work cycles on a stationary work piece. In either case, the manipulator is initially programmed during a teaching operation to establish the various desired positions during a work cycle wherein the desired positions are then recorded into memory. The programming or teaching with a moving conveyor may be performed by successively stopping the work piece at different closely spaced locations along the conveyor path, successively moving the manipulator to different positions and recording these positions as discussed in the above reference U.S. Pat. No. 3,744,032. The manipulator is then operated in a repeat mode to perform the repetitive work cycles. The manipulator, when operating with a moving conveyor, tracks an encoder depicting conveyor movement and moves from one programmed step to the next successive step according to the conveyor encoder.

From observation of the operating manipulator, in stationary or conveyor operation, the programmer-operator may detect that welds, for example, are not being performed in precisely the desired locations or a part being inserted or assembled is not being inserted to the desired depth or in the desired position. Also, in a moving conveyor situation, the operator may observe that the manipulator is not at the correct position according to the relative conveyor position. The reasons for the above misalignments or undesirable conditions are numerous and, for example, may have been caused by imperfect initial programming, slight shifts in the orientation of the work piece relative to the manipulator, wearing of manipulator tip or hand apparatus, part variations of the work piece assembly, replacement of dies or small positional changes in handling or delivery apparatus.

The positional misalignments or desired changes in the program steps may be very slight such as a few millimeters and may involve only one or two axes in one program step. Nevertheless, the manipulators of the prior art require that the work cycle and production line be stopped while the manipulator is reprogrammed and repositioned by further steps in the teach mode. This "down-time" or line stoppage in most applications is usually not convenient and many times both impractical and prohibitive economically.

SUMMARY OF THE INVENTION

It is, therefore, a primary object of the present invention to provide a new and improved programmable manipulator apparatus which may be reprogrammed in one or more of its axes while continuously operating.

It is another object of the present invention to provide a new and improved manipulator apparatus having a real time program modification apparatus to accomplish modification of stored digital positional representations in one or more different axes and one or more stored program steps.

It is a further object of the present invention to provide a real time program modification unit that allows the program operator to select the desired start/stop points of the program modification on first indicating switches and the desired directions and magnitudes of the positional changes in the different axes on second indicating switches.

It is a further object of the present invention to provide a real time program modification unit that automatically and sequentially reads the stored program data for each axis, modifies the stored data according to the desired selected positional changes, performs the desired modifications to stored program data and controls the manipulator to record the modified data into memory storage for a number of program steps that are to be modified according to the selected positional input data.

It is a still further object of the present invention to provide a real time modification unit which automatically starts and stops the modification of a selected program step or steps according to the operating program during a repetitive work cycle.

It is still another object of the present invention to provide a real time program modification unit wherein an operator may conveniently reprogram the operating apparatus in its repetitive work cycle by inputting the desired positional changes on convenient slide or thumb wheel switches, observing the results of the changed program while the apparatus is operating and further modify the data on successive repetitive work cycles according to observation.

It is another object of the present invention to provide a real time program modification unit that achieves the desired program modifications of data in all desired axes in one work cycle without interferring in any way with the operation, position or timing of the manipulator.

It is a further object of the present invention to provide a real time program modification unit wherein the operator selects the direction of change and the magnitude of desired positional change for each axis in positional increments to effectively allow the operator to "touch-up" or modify results according to the performance of the manipulator without any calculations or actual measurements on the part of the operator.

It is another object of the present invention to provide a real time program modification unit to modify or correct program steps during operation according to modified data in a very small period of time wherein the operator selects the desired positional changes and observes the selected modifications during the next replay of the modified program steps selected.

These and other objects of the present invention are efficiently achieved by providing a programmable manipulator apparatus employing a memory for storing digital representations corresponding to different positions of the programmable manipulator in a number of different axes. The manipulator apparatus includes encoders for developing positional signals representing the position of the manipulator in each of the axes. During repetitive work cycles, the stored digital signals in the memory are utilized as command signals and are compared with the encoder signals to move the manipulator to each set of positions in sequence corresponding to the various recorded positions as they appear in the memory. A program modification apparatus is provided to modify or correct certain manipulator positions of various sequence steps during the repetitive work cycle. The operator selects the program steps to be modified and the desired positional modifications of the manipulator both as to magnitude and direction in the various axes as determined by his observations and/or results of the work cycle.

The program modification apparatus includes programmable switches which are set by the operator to the desired start/stop points thereby identifying the program steps to be modified and further includes switches corresponding to the controlled axes of the manipulator which are programmed according to the desired direction and magnitude of the desired modification in each axis. Upon the next occurrence of the selected program steps, the program modification unit reads the stored data while the manipulator is operating and performing the work cycle, modifies the stored data in each axis according to the programmed positional changes and controls the manipulator memory to record the modified data. The process is repeated for each program step that is to be modified according to the program positional changes whereupon the program modification unit automatically ceases operation until another program modification is to be performed.

The invention, both as to its organization and method of operation together with further objects and advantages thereof, will best be understood by reference to the following specification taken in connection with the accompanying drawings.

BRIEF DESCRIPTION OF THE DRAWINGS

For a better understanding of the invention, frequent reference will be made to the drawings wherein.

DETAILED DESCRIPTION OF THE PREFERRED EMBODIMENT

Figure 1:
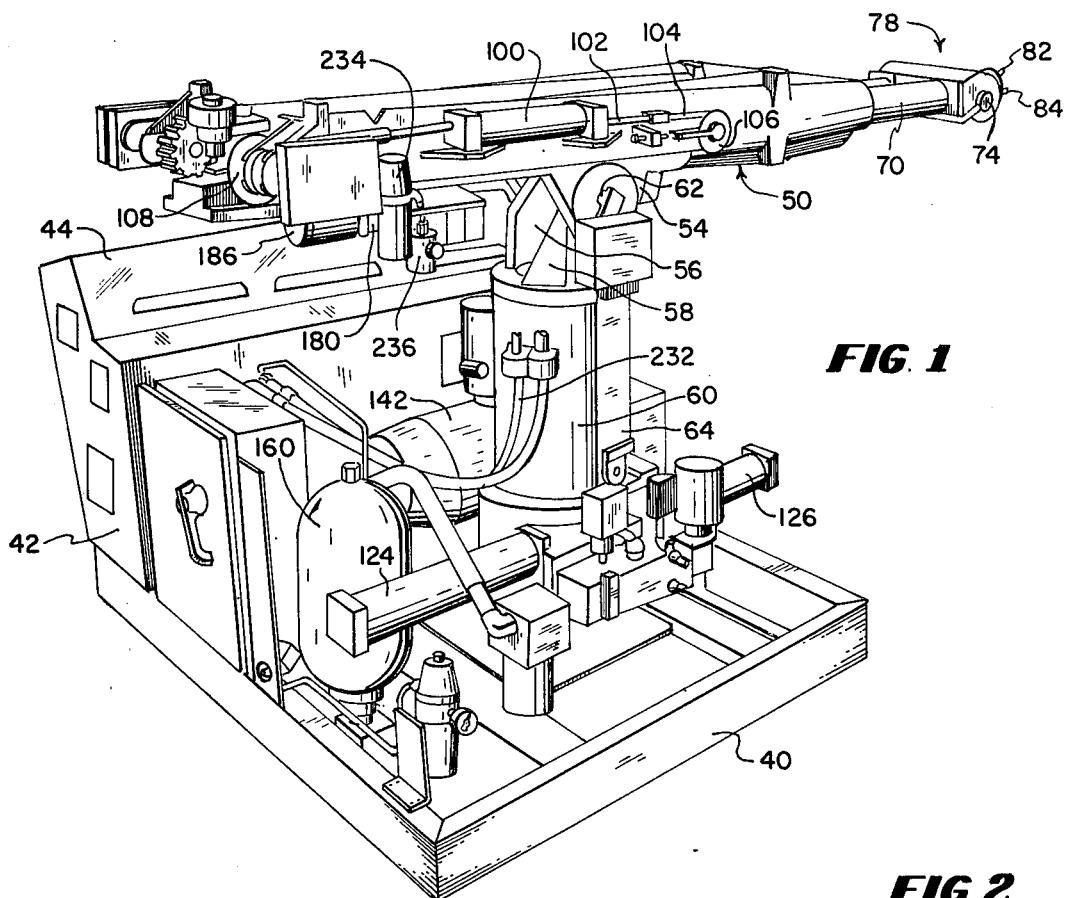
FIG. 1 is a perspective view of a programmable manipulator apparatus utilized in conjunction with the program modification unit of the present invention.
Figure 3:
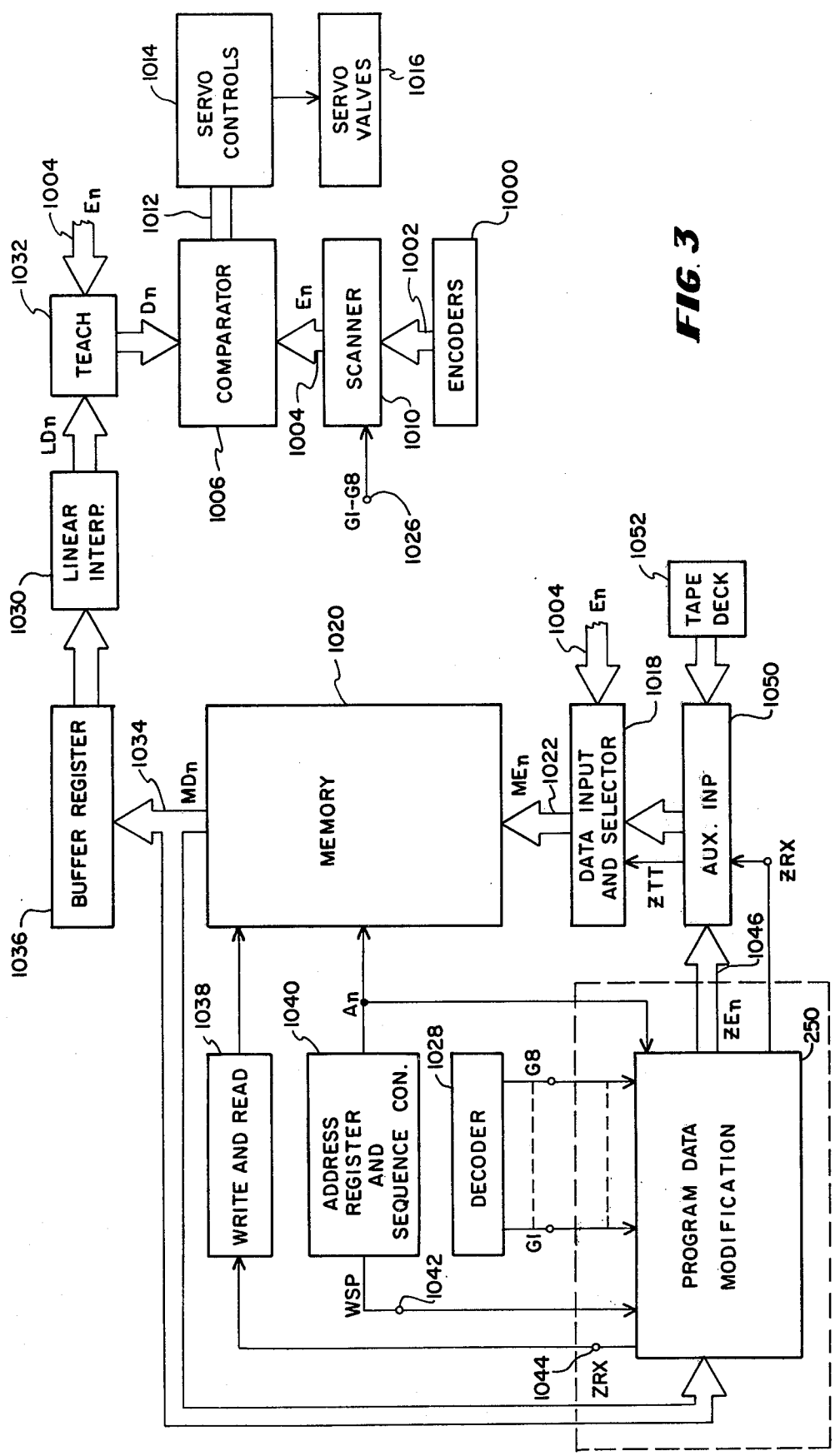
FIG. 3 is a block diagram representation of the control system of the manipulator apparatus and real time program modification unit of the present invention.

Referring now to the drawings and more particularly to FIG. 1, there is illustrated a programmed manipulator apparatus of the type which may be utilized in conjunction with the real time program modification apparatus of the present invention. The programmed manipulator apparatus is one of the same general type as described in detail in Dunne, et al. U.S. Pat. No. 3,661,051 and reference may be had to said patent for a detailed description of this general type of mechanism. Further, the control system of the manipulator apparatus, as illustrated in FIG. 3, is of the same general type as described in more detail in Engelberger, et al. copending application Ser. No. 625,932 to which reference may be made.

Specifically, the manipulator apparatus comprises a generally rectangular base or mounting platform 40 on which the hydraulically powered manipulator arm of the apparatus is supported together with all of the hydraulic, electrical and electronic components necessary to provide five programmed articulations or degrees of freedom for the manipulator arm.

Specifically, the base 40 supports a control cabinet indicated generally at 42 within which is housed the electronic control system portion of the manipulator apparatus, said cabinet having a control panel 44 on which are located the various controls of the control system necessary to control movement of the hydraulically powered manipulator arm in both an initial so-called teaching mode and in a repeat mode in which the manipulator arm is moved in repetitive cycles through a sequence of movements in each of the five axes as programmed during the teaching operation.

The hydraulically powered manipulator arm comprises a boom assembly indicated generally at 50, which is pivotally mounted for movement about a horizontal axis by means of a pair of ear portions 52 and 54 which are pivotally mounted on the outboard side of a pair of upstanding opposed ear portions 56 and 58 of a hollow trunk portion 60 which is rotatably mounted on a hollow, fixed vertically extending column the bottom portion of which is secured to the platform 40. The ear portions 52, 54 are mounted on stub axles 62 which project outwardly from the trunk ears 56, 58 so that the boom assembly is supported at points which are spaced relatively far apart so as to provide maximum resistance to torsional forces tending to twist the boom assembly 50 about its longitudinal axis.

The boom assembly 50 is tilted to give a down-up motion of the outer end of the manipulator arm by means of a down-up hydraulic cylinder 64 the bottom end of which is pivotally mounted in a block secured to the bottom edge portion of the trunk 60, the movable plunger portion of the cylinder 64 being pivotally secured to the boom assembly 50 forwardly of the trunk 60 so that movement of the piston causes the boom assembly 50 to pivot about the pivotal axis of the ear portions 56 and 58. In order to prevent excessive error in positioning the manipulator arm in the down-up axis, particularly when the boom 50 is extended and is carrying a heavy load, the trunk 60 is journaled in bearings 63 and 65 located at the bottom and top, respectively, of the fixed column 61. With this arrangement, the block 66 which mounts the lower end of the hydraulic cylinder 64 is located over the bearing 63 and side thrust developed by the cylinder 64 is transmitted directly to the fixed column 61 so that tilting of the trunk 60 about the vertical axis is avoided. As a result, the outer end of the boom assembly may be accurately positioned at full extension and maximum load.

The boom assembly 50 includes a pair of hollow extendable arm portions 70 which are arranged to be moved as a unit in and out of the corresponding portions of the boom assembly 50 by means of a hydraulic cylinder which is positioned between the arm portions 70 and provides a so-called "radial" extension or retraction of the manipulator arm. More particularly, the outer ends of the tubes 70 are secured to a crosshead assembly 74 intermediate the arm portions 70 and the extendable long stroke piston of the cylinder is pivotally connected to the crosshead assembly 74.

The crosshead assembly 74 carries a forwardly projecting hand portion 78 to which is connected a pneumatically operated clamping device indicated generally at 80, commonly called a hand assembly, which is provided with opposed grasping fingers 82, 84 arranged to support any desired object 86. Alternatively, the hand portion 78 may be provided with a welding tip or other appropriate fitting to perform various tasks.

The hand assembly 80 is arranged to be moved in two different axes independently of movement of the boom assembly 50. More particularly, the member 78 is arranged to be rotated about the pivotal axis of the crosshead assembly 74, this movement being referred to as wrist bend or simply bend.

In addition, the member 78 is arranged to be rotated about its longitudinal axis so as to produce a rotation of the hand assembly 80 about the central longitudinal axis of the boom assembly 50, this motion being referred to as wrist swivel or simply swivel.

In order to produce bending motion of the hand assembly 80, there is provided a hydraulic cylinder which is mounted along the left-hand side of the boom assembly 50 and is provided with a double ended piston-type plunger. The ends of the plunger are interconnected through a roller chain which extends over a pair of sprockets, so that linear movement of the double ended plunger is translated into rotational movement of beveled gears which in turn cause rotation of a torque tube which contains a ball-nut in the outer end thereof near the forward end of the boom assembly 50. This ball-nut is slidably engaged with a spline shaft carried within the arm portion 70 which is free to move into and out of the torque tube as the arm portion 70 is extended and retracted. Rotation of this spline shaft is then transferred by means of bevel gears in the crosshead assembly 74 into a bend motion of the hand portion 78 about the axis pivotal axis.

In a similar manner a hydraulic cylinder 100 is mounted on the right-hand side of the boom assembly 50 and is provided with a double-ended piston plunger 102, the ends of which are interconnected by means of a roller chain 104 extending around sprockets 106 also mounted on the right-hand side of boom assembly 50. Rotation of the rear sprocket 106 causes rotation of beveled gears which in turn produce rotation of a second torque tube having a similar ball-nut at the forward end thereof so that a spline shaft which is slidably engaged with the ball-nut is rotated in response to motion of the swivel plunger 102. Rotation of this spline shaft is then translated by means of beveled gears in the crosshead assembly 74 into rotary motion of the member 78 so as to produce the desired wrist swivel action of the hand assembly 80.

The fifth degree of freedom comprises a rotary motion of the entire boom assembly 50 about the vertical axis of the trunk 60. In order to provide a positive drive for the trunk 60 so that the boom assembly 50 may be accurately positioned in rotary motion and may be rapidly decelerated to the desired end point, a ring gear is mounted on the bottom end of the trunk 60 and engages a rack the ends of which are arranged to be connected to the plungers of a left-hand hydraulic cylinder 124 and similar right-hand hydraulic cylinder 126.

Accurate positioning of the boom assembly 50 in rotary movement is assured by means of a backlash control cylinder which is provided with a piston having an end button which protrudes from the cylinder and slidably engages the back side of the steel rack. System hydraulic pressure is supplied to the cylinder so that the button urges the rack into engagement with the ring gear with a force which is somewhat greater than the maximum separating forces experienced under maximum acceleration or deceleration conditions of the boom assembly 50. The hydraulic cylinders 124 and 126 are mechanically adjusted by means of screws so that the housings thereof are centered about the line of motion of the rack and the plungers of the respective cylinders. In order to reduce wear on the backlash piston button, this button is preferably made of bronze filled teflon.

Hydraulic power for the operation of the above described hydraulic cylinders is provided by a completely self-contained hydraulic system mounted on the base platform 40. Basic hydraulic power is generated by a gear-type pump which is driven by an electric motor 142. Hydraulic fluid, at atmospheric pressure, flows from a reservoir to the inlet of the pump 140. The output of the pump 140 flows through a ten micron filter to a base manifold which is mounted on the platform 40. An unloading valve in the base manifold 148 acts automatically to maintain an average system pressure of approximately 850 p.s.i. Under low flow demand, the output of the pump 140 is returned to the reservoir directly over the hydraulic return line. Under high flow demand, pump output is directed to the system hydraulic cylinders. A dump valve is provided in the base manifold which can be used to reduce system pressure to zero. A check valve is provided at the output of the unloading valve to prevent reverse flow of fluid when the pump 140 is operating under low flow demand or when it is not operating at all.

The output of the unloading valve 150 is directed to an accumulator 160, a pressure switch, a pressure gauge, and the five servo valves which are employed to control the above described hydraulic cylinders which move the arm and hand assembly in the desired five degrees of movement, these servo valves being individually controlled by electrical signals developed in the control system portion of the manipulator apparatus, as will be described in more detail hereinafter. Specifically, a rotary servo valve is mounted on the platform 40 and is arranged to supply controlled hydraulic fluid to the cylinder 124 over a conduit and to the cylinder 126 over another conduit. Hydraulic fluid at system pressure is also supplied over a conduit through the hollow trunk column support to a trunk through-feed assembly which provides a path for the flow of pressure and return fluid from the stationary base assembly to the rotating boom assembly 50. System pressure is also supplied to the pressure port of a down-up servo valve which is mounted on and rotatable with the trunk 60, the down-up servo valve being arranged to supply controlled pressures to either end of the hydraulic cylinder 64 over conduits. The feed-through manifold also supplies system pressure to a boom manifold 180 which is mounted on and is rotatable with the boom assembly 50. The boom manifold directs fluid at system pressure to the pressure port of an out-in servo valve which is mounted on the rear end of the boom assembly 50, a bend servo valve which is mounted on the left-hand side of the boom assembly 50 beneath the bend cylinder 90, and a swivel servo valve 186 which is mounted on the right-hand side of the boom assembly 50.

The out-in servo valve supplies controlled pressure over a conduit to the rear end of the out-in hydraulic cylinder. The differential piston area thus provided in the cylinder permits cylinder operation over a long stroke and at a reduced net flow requirement.

The bend servo valve supplies controlled pressure to left-hand bend motion hydraulic cylinder over conduits and the swivel servo valve supplies controlled pressure to the cylinder 100. The servo valves each act to direct fluid under pressure to one side of the hydraulic cylinder and open the opposite side of the cylinder for return flow over a return conduit. With regard to the rotation cylinders, fluid is admitted and returned from the piston side of each actuator so that the two pistons of the cylinders 124 and 126 and the rack act as a single piston in a single cylinder.

A pair of relief valves are connected across the output of the rotary servo valve and act to direct excessive pressure to the return line so as to improve the deceleration characteristics of the boom assembly 50 in rotary motion and to eliminate shock loads on the rack and ring gear.

Compressed air for operation of the hand clamp is supplied through a regulator, a flexible hose 232 to the boom assembly 50, and through an in-line lubricator 234 to the pressure port of a three-way solenoid valve 236. The lubricator 234 introduces a measured amount of oil according to air flow for lubrication of the working parts of the air system. The controlled port of the solenoid valve 236 supplies controlled air through a telescoping air line and a swivel fitting to the hand air cylinder while permitting boom and hand motions. When the solenoid 236 is deenergized, pressure air is connected to the hand cylinder causing the fingers 82, 84 to close.

When the solenoid 236 is energized the solenoid pressure port is closed, the hand cylinder is connected to exhaust and the hand is spring urged to an open position.

Each of the servo valves is a four-way, infinite-position valve which is responsive to both the polarity and amplitude of a direct current signal developed in the control system portion of the apparatus. Direction of motion of the pilot spool in each servo valve is determined by the polarity of the incoming electrical signal and the magnitude of this signal determines how far the valve will open and therefore how fast the controlled hydraulic actuator will move. Preferably, these servo valves are actuated by a long stroke electromagnetic actuator mechanism which is positioned in line with the pilot spool of the servo valve to provide fast response of the servo valve and its associated hydraulic cylinder to the incoming electrical signal on a hydraulic feedback basis and without requiring mechanical linkages for feedback to the input, as will be described in more detail hereinafter.

Considering now the control system portion of the manipulator apparatus, reference is made to FIG. 3 wherein the basic components of the control system are shown in block diagram form in conjunction with the control and actuating mechanisms of the manipulator apparatus. The various control circuitry is housed inside the control cabinet 42. In accordance with an important aspect of the present invention, a real time program data modification unit 250 is provided preferably contained in a carrying case assembly, FIG. 2, which may be connected by means of a flexible cable to the control cabinet which plugs into the test connector of the control console 44. This flexible external connection to the manipulator apparatus allows the operator to attach the real time program modification unit 250 to a particular manipulator apparatus to be modified while operating and observe the operation while modifying the desired program steps. The unit 250 may then be disconnected and utilized elsewhere or stored remotely from the manipulator apparatus.

The control system for the manipulator apparatus is of the same general type as described in detail in Dunne, et al. U.S. Pat. No. 3,661,051 to which reference may be made for a detailed description of this general type of control system. For the purposes of the present invention, it may be stated generally that each of the five axes of the manipulator is provided with a suitable digital encoder which provides an absolute position measurement of the position of the manipulator arm in each of the five controlled axes at all times. In this connection it will be understood that the encoders associated with each axis, may if desired, comprise a suitable synchro with an associated analog to digital converter for converting the sine wave output of the synchro to a corresponding digital output. Such an arrangement is shown in Dunne U.S. application Ser. No. 442,862 filed Feb. 15, 1974. Alternatively, the real time program modification unit may be employed with the manipulator apparatus as described in copending application Ser. No. 625,932 filed by J. F. Engelberger, et al on Oct. 28, 1975.

During the teaching operation, the various hydraulic motors previously described, which are used to move the manipulator arm in each of the five controlled axes, are energized, usually at relatively low speeds, for a sufficient time interval to bring the manipulator arm to a desired position in all axes. As this movement is accomplished in each axis, the encoders are correspondingly driven through suitable gearing. When the desired position is achieved in all axes, the digital encoder values are all recorded in a suitable memory where they may be used as command signals during the playback mode of operation of the manipulator.

During playback, the actual position of the manipulator arm, as indicated by the digital encoders associated with each axis, are compared with the digital command signals previously recorded in the memory during the teaching operation; the output of the comparator providing an error signal which is employed to control the driving motor in each axis so as to move the manipulator arm to the new commanded position.

Considering now the electronic circuitry and control elements utilized to control the manipulator arm, reference is first made to FIG. 3 wherein a closed loop teach arrangement is shown. The digital output 1002 of the various encoders 1000 of the five axes is connected through a scanner circuit 1010 which multiplexes the various encoder inputs according to a predetermined scanning cycle so that the outputs from the five encoders 1002 are sequentially supplied as $E_n$ output 1004 to a comparator 1006 and the closed loop teach circuitry 1032. In the teach mode, the closed loop teach circuitry 1032 supplies the multiplexed encoder data to the data input $D_n$ of comparator 1006 with the output 1012 of the comparator driving the servo controls labeled generally at 1014 which in turn control the servo valves labeled generally at 1016. This closed loop teach arrangement, in the teach mode, prevents the manipulator arm from drifting during the teach operation so that the appropriate positional data may be recorded in a teach mode in an accurate manner. The comparator 1006, servo control 1014 and servo valves 1016 are all of the same general design and substantially similar to that described in detail in the above-identified Dunne, et al. U.S. Pat. No. 3,661,051 and form no part of the present invention.

The multiplexed encoder signals $E_n$, 1004, are also connected as an input to the data input and selector circuit 1018 which is controlled in the close loop teach mode to input the multiplexed encoder signals to the memory or data storage circuit 1020 over output lines 1022 indicated generally as $ME_n$ when the operator decides to record a particular position in a teach mode by depressing a button on the teach control all substantially as described in detail in the above-identified U.S. Pat. No. 3,661,051 and U.S. application Ser. No. 625,932. The multiplex scanning control signals 1026 provide the multiplex pulses on the output conductors $G_1$ to $G_8$ inclusive to control the multiplexing of the scanner circuit 1010 and are developed by decoder circuit 1028.

During the playback or repeat mode of operation of the program manipulator, it is contemplated that the manipulator will function primarily in a point to point mode of operation wherein successive program steps are supplied from the memory 1020 to the comparator 1006 as position command signals which are compared with the actual position signals of the encoders labeled generally at 1000. The manipulator arm is thus moved in all five controlled axes until the error signals as defined by the comparator output 1012 in these axes have been reduced to a desired degree of accuracy through the comparator circuitry 1006 along with servo controls 1014 and servo valves 1016. The comparator stage referred to generally at 1006 in FIG. 3 further includes a digital to analog converter operating on a multiplex basis and a sample and hold circuit for each servo controlled axis as described in more detail in the above-identified U.S. Pat. No. 3,661,051 and U.S. application Ser. No. 625,932. The various positional command signals represent the various points that have been recorded in the teach mode.

In addition to a point to point mode of operation in the playback or repeat mode, the program manipulator may also be controlled with a linear interpolation circuit 1030 whereby short straight line constant velocity steps may be provided so that a simulated continuous path control mode is provided in a discrete number of intervals between the point to point recorded steps. The linear interpolation circuitry 1030 is shown and described in more detail in the above reference copending application Ser. No. 625,932. The positional command data signals 1034 from memory 1020 are indicated generally as $MD_n$ and these data signals, also multiplexed, are supplied through a buffer register 1036 to the comparator through the linear interpolation circuit 1030 and the closed loop teach circuitry 1032 as the position command signals $D_n$ to comparator 1006. When in the normal point to point repeat mode, these command signals are unaffected by the linear interpolation circuit 1030 and the closed loop teach circuit 1032. The various data signal lines $E_n$, $D_n$, $ME_n$ and $MD_n$ are all 15 bit data words and each signal line comprises 15 conductors. A write and read circuit 1038 controls the memory 1020 so as to record positional data during the teach, program modification and auxiliary modes and to have the memory read out stored data words during a repeat or playback mode. To record data words in the appropriate memory storage slots and further to read stored digital information from the correct storage position in memory 1020, an address register and sequence control circuit 1040 is provided to produce an address signal $A_n$ to control memory 1020 and control the storage location which is recorded into or read out. The address signal $A_n$ includes digital bits of information and comprises a like number of conductors or signal lines to represent the desired number of program step addresses for the particular application of the manipulator which in a specific embodiment may include 12 conductors and 12 bits of information corresponding to 4096 address locations of program steps.

In accordance with an important aspect of the present invention, a real time program data modification unit 250, interconnected with the various control apparatus of the programmed manipulator, is provided whereby modification of the positional command signals stored in the memory 1020 may be accomplished while the manipulator apparatus is operating in the repeat or playback mode. Referring now to FIGS. 2–5, the program data modification unit 250 utilizes the $A_n$ address step input and a WSP signal 1042 which provides a pulse each time the address step is changed, along with the $G_1$ through $G_8$ multiplex scanning outputs of decoder 1028. The memory data outputs $MD_n$ are also provided to the data modification unit 250. The program data modification unit, as will be explained in detail hereinafter, produces a write control output ZRX, indicated as 1044, and a modified data output bus $ZE_n$, indicated as 1046, which comprises the input data $MD_n$ as modified by the program data modification unit 250. The modified data $ZE_n$ is provided to an auxiliary input selector 1050 which may have other inputs such as a tape deck 1052. The auxiliary input circuit 1050 is controlled to switch one of the auxiliary input such as $ZE_n$ or the tape deck output to a data input and selector board 1018 which in turn is controlled to supply data, $ME_n$, to the memory from either the auxiliary input circuitry 1050 or the scanner output 1004 indicated as $E_n$.

Figure 2:
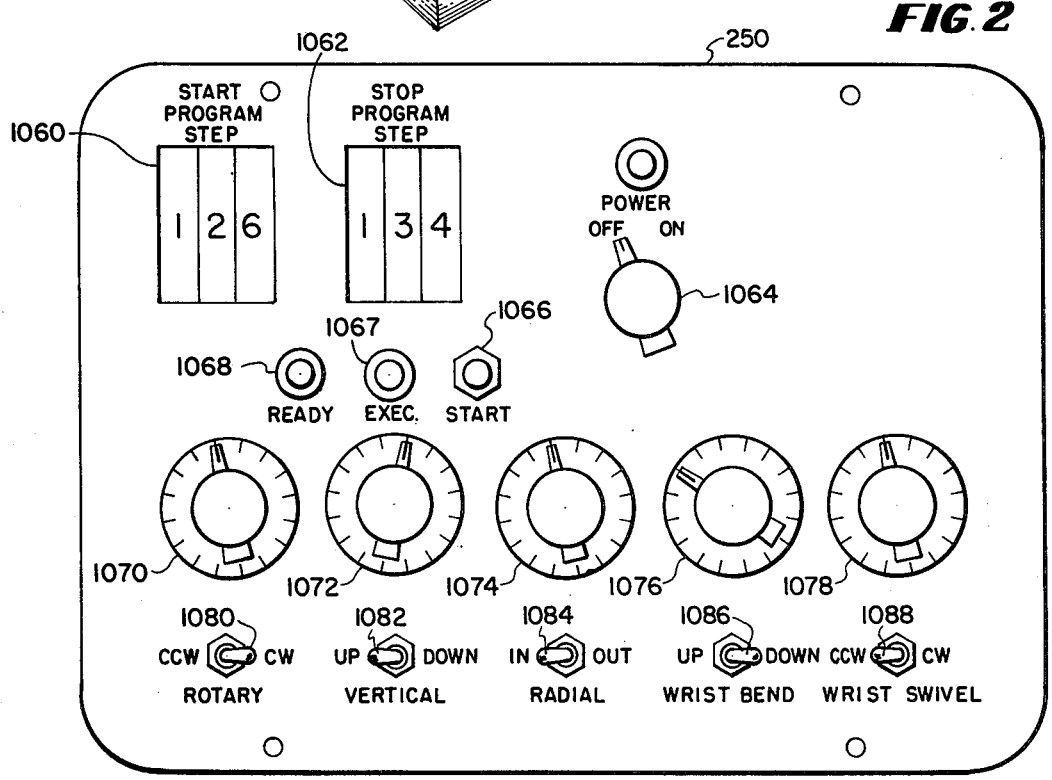
FIG. 2 is an elevational view of the real time program modification unit of the present invention which controls and interfaces with a manipulator apparatus such as that illustrated in FIG. 1.

The positional modification controls of the unit 250 are illustrated in FIG. 2 wherein thumb wheel selector switches 1060 and 1062 are provided to select the start program step and stop program step, respectively, the switches being programmed by the operator to the desired programmed steps to be modified although it should be understood that other suitable program step indicating switches could also be utilized. A power switch 1064 is also provided to actuate the modification unit 250 and a start button or switch 1066 is provided that is actuated when the operator decides to initiate the program modification process. An execute indicator 1067 is provided to indicate the executing of the program modification of the selected steps allowing the operator to know precisely when the modification is taking place. A ready indicator 1068 is automatically actuated when the program modification unit has completed the desired data modification. An N position slide or rotary switch such as switches 1070, 1072, 1074, 1076 and 1078 are provided on which the operator selects the magnitude of the positional modification to be accomplished for each controlled axis. The positional modification switches 1070 through 1078 inclusive correspond to the rotary, vertical, radial, wrist bend and wrist swivel axes, respectively. A toggle or suitable switch is also provided for each of the controlled axes with switch 1080 corresponding to the rotary axis and switches 1082, 1084, 1086 and 1088 corresponding to the vertical, radial, wrist bend and wrist swivel axes, respectively. The switches 1080 through 1088, inclusive, determine the direction in which the programmed data is to be modified by the positional magnitude indicated on the switches 1070 through 1078. The positional magnitude switches 1070 through 1078 are calibrated in incremental steps of a convenient magnitude such as 0.1 inch per increment and each step is calibrated in an integral number of bits so that the switch output is readily coded into binary form.

The operator or programmer after observing the repetitive work cycle of the manipulator first decides what program steps are to be modified to correct the position of a weld or modify the orientation of a part during assembly. He then estimates the required positional changes in the various axes to effect the proper modification of the steps. The operator proceeds to select the correct positional change both as to magnitude and direction for each axis on the appropriate switches as well as entering the correct start and stop program steps on switches 1060, 1062. After connection to the manipulator apparatus and placing the power switch 1064 in the on position, the start button 1066 is actuated.

The program modification unit 250 now proceeds to automatically modify the stored data in memory 1020 in each of the controlled axes to be modified in each program step indicated by the program step switches while the manipulator is operating during the next occurrence of the selected steps. The execute light 1067 is activated while the steps are being modified. Also, the unit 250 automatically ceases operation and actuates the ready light 1068 to indicate to the observer that the desired program modification has been accomplished. The entire process from the time the data is inputted to the actuation of the ready light normally takes place in a matter of a few seconds. The observer with the program modification unit 250 still connected to the manipulator, may now observe if the program modification changes have accomplished the desired result as the steps are modified and then disconnect the modification unit from the manipulator if the desired effects have been achieved. On the other hand, if further modifications in these steps or other steps are required, the operator reprograms the switches of the various axes to be modified and again starts the program modification unit and repeats this procedure until the complete work cycle is being performed to his satisfaction according to observation and work cycle results.

Figure 4:
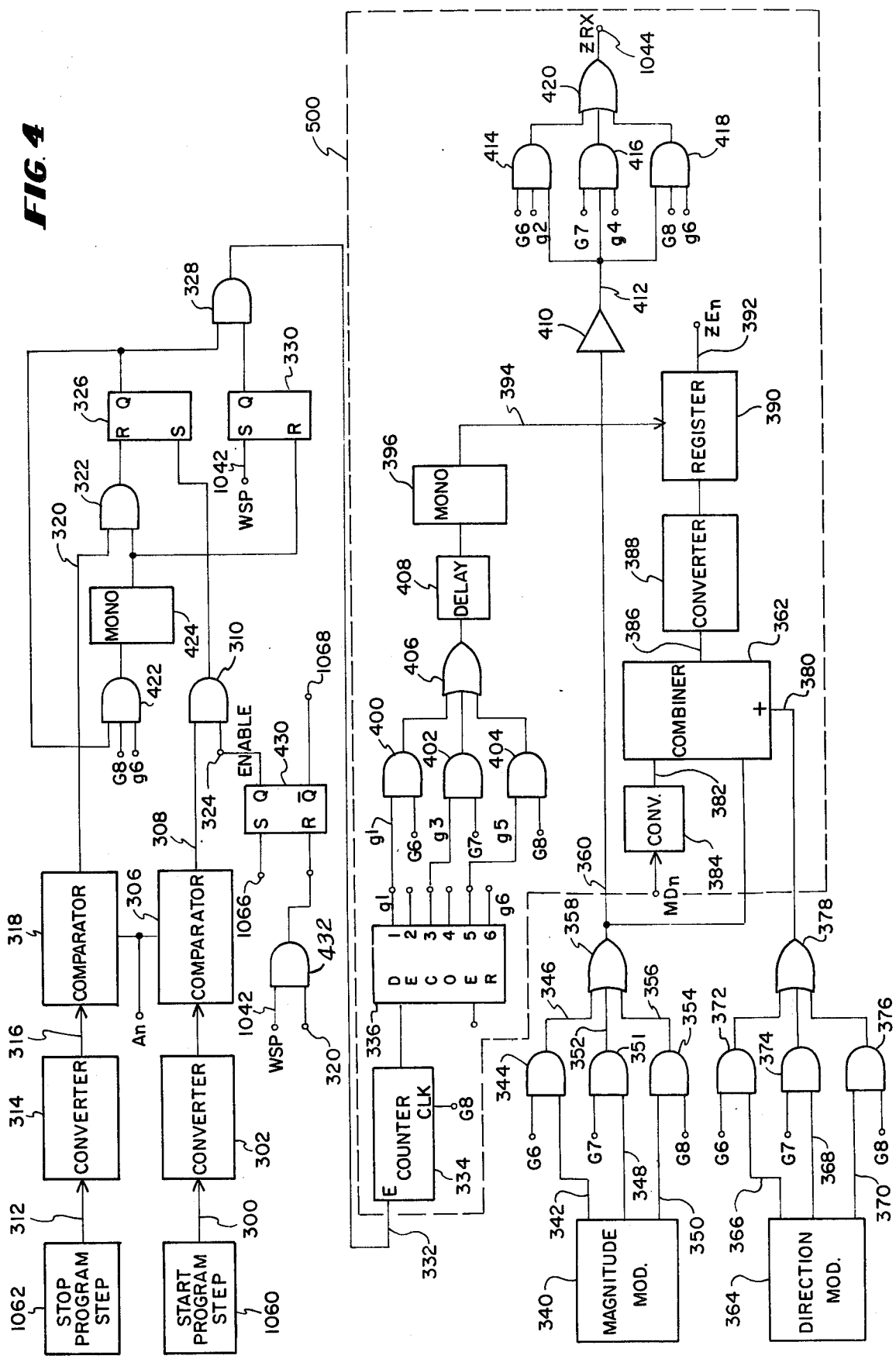
FIG. 4 is a schematic logic diagram of the real time program modification unit of the present invention.
Figure 5:
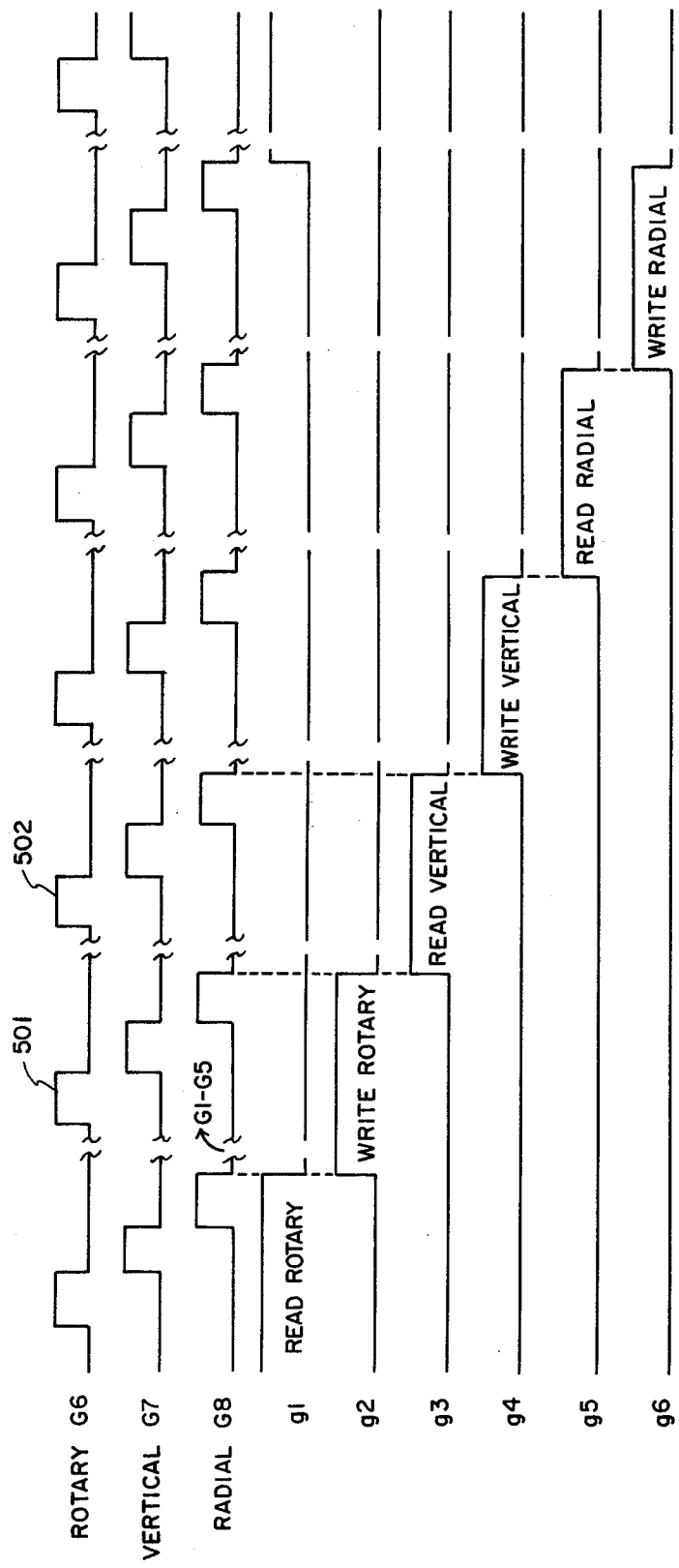
FIG. 5 is a diagrammatic representation of various waveforms of the signals at various points in the apparatus illustrated in FIGS. 3 and 4.

Considering now the circuitry of the program data modification unit 250 and referring more specifically to FIGS. 4 and 5, the start program step circuitry 1060 provides a BCD digital output 300 to a BCD binary converter stage 302 which connects the start program step information in binary form to the magnitude comparator stage 306. A second input to the comparator 306 is the address data bus $A_n$ which the comparator 306 compares to the start program step input. The comparator 306 provides an output 308 to a two input AND gate 310 which has a high logic level when the start program step selected on a thumb wheel switch is equal to the program address step $A_n$ and a low logic level when the address step $A_n$ is less than the start program step selected on switch 1060.

Similarly, for the stop program step stage 1062, the output 312 is processed by a converter 314 with the binary output 316 of the converter 314 connected to a magnitude comparator 318 which also has the $A_n$ address step signal as an input. The output 320 of comparator 318 produces a high logic level when the stop program step is equal to the address step $A_n$ which is connected to one input of a two input AND gate 322. An enabling signal 324 is a second input to the AND gate 310 and switches to a high logic level when the start button 1066 is actuated with the output of gate 310 connected to the set input of a latch 326 thereby setting the latch. The Q output of latch 326 is connected to one input of a two input AND gate 328 whose second input is connected to the Q output of a second latch 330 which is set by the address step signal WSP, 1042. When the address step is equal to the start program step selected at 1060, latch 330 is set and enables the output of gate 328 and the program modification sequence. The output of gate 328 is connected to the enabling input 332 of a six stage counter 334 which drives a decoder stage 336.

The counter 334 is clocked on the trailing edge of multiplex scanning cycle pulse $G_8$, waveform shown in FIG. 5. The multiplex scanning outputs $G_6$ and $G_7$ are also shown in FIG. 5 with the scanning pulses $G_1$ through $G_5$ occurring between $G_8$ and $G_6$ indicated as a break in the time axis of the $G_8$ waveform in FIG. 5. The embodiment of the program modification unit of FIG. 4 is illustrated with three program modification axes rather than the complete five axes of the program manipulator for simplicity, although any number of controlled axes could be utilized. The decoder 336 produces six timing signals $g_1$ through $g_6$, illustrated in FIG. 5, in a sequential pulse train relationship with one timing signal being produced upon each successive occurrence of the $G_8$ pulse to the counter 334.

To optimize circuit utilization, the program modification is made sequentially one axis at a time such that two system scan cycles are utilized to effect the program modification in each axis, one to read the positional data $MD_n$ from the memory 1020 and the second to write or record the modified positional data $ZE_n$ into the memory 1020. Referring to the system multiplexing scan cycles $G_1$ through $G_8$, the first three scan cycles $G_1$ through $G_3$ are allotted for auxiliary functions and the last five signals $G_4$ through $G_8$ correspond to the five controlled axes and for purposes of illustration $G_6$ corresponds to the rotary axis, $G_7$ to the vertical axis and $G_8$ to the radial or in/out extension or retraction of the manipulator arm. The program modification timing intervals $g_1$, $g_3$ and $g_5$ correspond to read memory data modes in the rotary, vertical and radial axes, respectively. Similarly, timing signals $g_2$, $g_4$ and $g_6$ correspond to write-into-memory modes in the rotary, vertical and radial axes, respectively.

The desired amount of positional change for each axis is selected by positional switches 1070, 1072 and 1074 in the rotary, vertical and radial axes, respectively, whose binary representations are indicated as magnitude modification stage 340 in FIG. 4. The rotary axis positional modification binary output data bus 342 is connected to one input of an array of rotary scanning gates labeled generally as 344 which include a $G_6$ rotary multiplex scanning input. The array of gates 344 is effective to produce the binary data bus lines 346 corresponding to the rotary positional modification selected during the $G_6$ scanning period. Similarly, the vertical positional modification data bus 348 from magnitude modification stage 340 is connected to an array of vertical scan control gates 351 which include the vertical $G_7$ multiplex scanning input to produce an output in data bus form at 352 during the $G_7$ multiplex scanning period. Correspondingly, the radial positional modification data bus 350 of magnitude modification stage 340 is connected to an array of radial scanning control gates 354 which produce an output in data bus form at 356 during the $G_8$ or radial scanning multiplex period. The three output data buses 346, 352 and 356 representing the rotary, vertical, and radial positional modification changes, respectively are each connected to one input of a three input data bus OR gate array 358. Each of the data bus lines 342, 346, 348, 350, 352 and 356 comprises a plurality of lines and a like number of bits of information as determined by the maximum magnitude of positional modifications desired and the accuracy (least significant bit) at which the modification is to be accomplished. In a specific embodiment, six lines and six bits of information are provided for each data bus such that the least significant 64 bits of information may be modified for each axis.

The output 360 of gate array 358 is connected to one input of a combiner or full adder stage 362 which adds or subtracts in a data bus format. During scanning period $G_6$, the output 360 will present the rotary modificational data information. During multiplex scanning periods $G_7$ and $G_8$, output 360 will present the vertical and radial positional data changes, respectively, so as to form a time shared or multiplexed data input to the combiner 362.

The direction modification stage 364 represents generally the binary data bus outputs of the three direction input switches 1080, 1082 and 1084 in the rotary, vertical and radial axes, respectively. The direction modification stage 364 includes a digital output 366 for the rotary direction, output 368 for the vertical direction and output 370 for the radial direction. The binary outputs 366, 368 and 370 represent a change in either the counterclockwise or clockwise sense for the rotary axis, the up or down direction for the vertical axis and the in or out sense for the radical axis. The rotary direction signal 366 is connected to one input of a two input AND gate 372 with the second input connected to the $G_6$ or rotary multiplex scanning signal. Similarly, the vertical direction signal 368 is connected to one input of a two input AND gate 374 whose second input is connected to the $G_7$ scan signal. Further, AND gate 376 has one input connected to the radial direction signal 370 and the second input connected to the $G_8$ scanning signal. The outputs of gates 372, 374 and 376 are connected to a three input OR gate 378 whose output is connected to an addition or subtraction mode input 380 of the combiner 362.

During the particular scanning period $G_6$, $G_7$ or $G_8$ when the combiner is operating on appropriate input data, the input 380 determines whether the combiner will add or subtract the modified position data at input 360 from the stored memory data provided at a second data input 382 which is connected through a code conversion state 384 to the memory data output 1034 identified as $MD_n$. The code conversion state 384 is utilized to convert the memory data $MD_n$ for the particular program step being modified from Gray code to binary code since the memory stores the code in Gray code format.

The combiner 362 during the scanning period $G_6$ combines the stored memory data with the positional modification data to add or subtract the modification data in the direction as determined by the direction modification stage 364 to produce a data bus output 386 representing the combined data information of the modified positional information. Similarly, combiner 386 provides the positional modification data for the vertical axis during time period $G_7$ and the radial modification information during time period $G_8$. The output of combiner 386 is processed through a binary to Gray code converter stage 388 and stored in register stage 390 in a data bus format to be provided at output 392 identified as $ZE_n$. The $ZE_n$ lines are the input 1046 to the auxiliary input stage 1050 to be processed and stored into the memory 1020 at the correct time interval as to be explained in detail hereinafter.

Effectively, the register 390 stores modified rotary positional data to be recorded during scanning period $G_6$, modified vertical positional data during scanning period $G_7$ and modified radial positional data during scanning period $G_8$. The register 390 is controlled by an enable strobe line 394 connected to the output of monostable stage 396. The storage register stage 390 is necessary to store the modified positional data for one system scanning cycle since data for any controlled axes can only be read from the memory or recorded into memory once per system scanning cycle.

Thus, the data for a particular axis is read during one multiplex scanning cycle such as during the scan interval $G_6$ corresponding to $g_1$, and written into memory during the next successive scan cycle corresponding to timing period $g_2$. Since the positional data from memory is read out in a scan multiplex period such as $G_6$, the strobe line 394 is delayed relative to the leading edge of a scan signal such as $G_6$ to insure that the modified data is transferred to the storage register 390 after the memory read out sequence.

The read timing signals $g_1$, $g_3$ and $g_5$ at the output of decoder 336 are utilized in combination with the multiplex scanning signals $G_6$, $G_7$ and $G_8$ to control the storage register 390 through an array of gates to store rotary modified positional data during read cycle $g_1$, vertical modified positional data during read cycle $g_3$ and radial modified positional data during read timing period $g_5$. This is accomplished by connecting read timing signal $g_1$ to one input of a two input AND gate 400 whose second input is connected to the multiplex scanning rotary signal $G_6$. Similarly, for the vertical axis, two input AND gate 402 has one input connected to the $g_3$ vertical read signal and the second input connected to the vertical scan signal $G_7$. A two input radial timing AND gate 404 has one input connected to read timing signal $g_5$ and its second input connected to the radial scan signal $G_8$. The outputs of gates 400, 402 and 404 are combined by OR gate 406 whose output drives a delay stage 408. Delay stage 408 is connected to the monostable stage 396 which controls the strobe line 394 of the register 390. As a result of the timing controls in the combinational gates, modified positional data identified as $ZE_n$ is presented at the output 392 of register 390 for controlled rotary axis for the entire system write cycle timing period $g_2$. Similarly, vertical modified positional data is presented during the entire write timing cycle $g_4$ and modified radial positional data for the entire radial write timing period $g_6$.

The write command signal 1044 identified as ZRX controls the write and read stage 1038 to record modified positional data into the memeory 1020 and is activated during write timing cycles $g_2$, $g_4$ and $g_6$ for the rotary, vertical and radial axis, respectively, whenever combinational gate 358 at output 360 indicates that modified positional data has been entered on selection switches of the real time program modification unit. Detection gate 410 monitors the output 360 of modified positional combinational gate 358 and produces a high logical output at 412 whenever modified positional data is present at the inputs of gate 358 during a particular multiplex scanning cycle $G_6$, $G_7$ or $G_8$.

The data detection output 412 of gate 410 is an input to each of the three combinational 3 input AND gates 414, 416 and 418 which correspond to the writing control gates for the rotary, vertical and radial axes, respectively. Rotary write gate 414 also has write control signal $g_2$ and multiplex scan signal $G_6$ as inputs. Similarly, vertical write gate 416 has multiplex scan signal $G_7$ and vertical write signal $g_4$ as inputs and radial write gate 418 has multiplex scan signal $G_8$ and radial write signal $g_6$ as inputs. The outputs of gates 414, 416 and 418 are connected to an OR gate 420 whose output forms the write control signal ZRX.

The combinational write gates are effective to produce a write signal ZRX to record into memory modified positional data for the rotary axis during timing period $g_2$, for the vertical axis during $g_4$ and the radial axis during $g_6$. The recording of modified positional data into the memory 1020 during the replay mode may have various effects on the control circuitry dependent upon the characteristics of the memory 1020 and the comparator stage 1006. The comparator stage referred to generally at 1006, FIG. 3, as described in more detail in the above referenced U.S. Pat. No. 3,661,051 and U.S. application Ser. No. 625,932 includes a multiplexed digital to analog converter and a sample and hold circuit or storage capacitor for each axis. The sample and hold circuit stores the analog error voltage provided from the digital to analog converter once every system scanning cycle for each axis. When data is written into or recorded in memory stage 1020, the output of the memory is characterized by the specific type of memory circuit utilized. The memory may produce no output when in the record mode or alternatively may either provide at its output the new data as it is written or the original data that was in the memory before the writing. The latter two alternatives pose no problem to the operation and control of the programmable manipulator in replay since either the originally recorded data (unmodified) or new modified positional data are acceptable inputs to the comparator. However, if the memory produces no output when in the write or data entry mode, the comparator would receive a zero input on all data lines at the $D_n$ input which in turn would produce an error signal at the output 1012 of the comparator 1006 which is the encoder reading at the time which will be an extremely large and invalid error signal rather than the difference between the encoder reading and the recorded data $MD_n$. To alleviate this condition, if a memory of this type is contemplated, the analog error signal at the output of the digital to analog converter may be disabled so that no connection or sample is provided to the sample and hold circuit storage capacitor for an axis when the write signal ZRX is active. Therefore, no new sample will be provided to the sample and hold storage capacitor for the particular scan cycle or portion of the scan cycle during the writing of modified data. The sample and hold circuit, specifically capacitors 676, 678, 680, 682 and 684 in the above referenced patent, FIG. 11, for a particular axis will maintain the sample or input from the previous scan cycle and control of the apparatus and servo control for the respective axis will continue normally. This error signal will be maintained for the particular axis in which modified writing is taking place until the next successive system scan cycle which is not a write cycle wherein the sample and hold circuit will be updated with a new input representative of the difference between the modified data in memory and the present encoder reading for the axis. The maintenance of the same error signal for two scan cycles functionally approximate the alternative situation where the originally recorded data is read out of memory since this is the data that is maintained except for the change in encoder portions between the two scan cycles. The disabling of the output of the digital to analog converter stage during a write signal period may be accomplished in various ways. For example, in the apparatus as described in U.S. Pat. No. 3,661,051, the two input error sample enabling gates 533, 535, 537, 539 and 541 as shown in FIG. 11 may be replaced by three input AND gates wherein the third input of each gate is connected to the inverse of the ZRX write signal. For the comparator and sample and hold circuity illustrated in application Ser. No. 625,932, the analog sample and hold control gate 764 as illustrated for the rotary axis in FIG. 25 of that application would be replaced with a three input AND gate with the inverse of the ZRX write signal as the additional input. Similar modification would be made for other controlled axis sample and hold gates. Accordingly, the enabling gate will be activated normally except when the writing of modified data is occurring. Such a modification, however, as discussed previously, is only necessary if a memory circuit for stage 1020 is utilized that produces no output during the writing of memory.

The modified positional data written into memory during timing periods $g_2$, $g_4$ and $g_6$ is then read out as command signals during successive system scan cycles of the modified program step. For example, referring to FIG. 5, the modified rotary axis data written into memory during write cycle $g_2$ and scan period $G_6$ identified as 501 is read out of memory during the next system scan period $G_6$ for the rotary axis identified as 502 and utilized as the command signal. Thus, the manipulator arm is moved to the modified commanded positions in memory 1020 during the same program step of the work cycle in which the data was read out, modified, and written into memory. The manipulator arm begins to move to the modified commanded position for a particular axis during the system scan cycle immediately following the write cycle for that axis.

If no positional modification data has been entered on the real time program modification unit for a particular control axis, the ZRX signal will not be activated and data will be read out from memory as a normal program step and no new data will be recorded.

Upon the occurrence of the trailing edge of multiplex scanning signal $G_8$ during radial write timing period $g_6$, all positional modification corrections will have been made for the current program address step indicated by stage 1060. Accordingly, three input AND gate 422 with scan signal $G_8$, radial write timing signal $g_6$ and the Q output of latch 326 as inputs, resets latch 330 through a monostable stage 424. The Q output of latch 330 disables counter 334 through gate 328. Therefore, the timing system signals $g_1$ through $g_6$ are deactivated and the program modification sequence has been completed for the program step selected in the start program step stage 1060. In this case, a one step program modification, the program step number entered in the stop program step stage 1062 is the same as the start program step in stage 1060. The output of magnitude comparator 318 will also be activated and will reset latch 326 through gate 322 and the program modification unit will be inactivated until another series of program modification steps are initiated by the operator.

When stop program step stage 1062 has been programmed for one or more program step numbers beyond the start step stage 1060, the output of magnitude comparator 318 will be inactive and latch 326 will not be reset at the end of timing signal $g_6$ corresponding to the completion of modified positional data for the start program step. Thus, latch 330 remains reset until the occurrence of a pulse on address step line 1042, identified as WSP, which corresponds to the stepping of the memory 1020 to the next recorded address step; i.e., one step beyond the start step indicated in 1060. At this time, WSP will again set latch 330 and the entire cycle with generation of timing signals $g_1$ through $g_6$ upon activation of counter 334 will occur to modify the positional data in this next successive address step and record the modified positional data into memory similarly to the start step.

The recording of the same desired positional modifications for each successive step between the start program step and the stop program step indicated at switches 1060 and 1062 will continue to be recorded into the memory until the address identify $A_n$ equals the program step selected in the stop program step switch 1062. At this time and after modifying the date at that step, latch 326 will be reset and the real time program modification unit 250 will be inactivated until the operator reprograms new modificational data and again initiates the real time program modification sequence by activating the start control 1066.

The write signal ZRX is also effective to control the auxiliary input stage 1050 and the data input and selector stage 1018 of the manipulator control circuitry to present the modified positional data $ZE_n$ to the memory 1020 during the program modification sequencing. The ready or completed modificational sequence indicator 1068 is actuated by the Q output of a latch 430 which is set by the start button 1066 and whose Q output is the enable signal 324. The start latch 430 is reset by an AND gate 432 which has the WSP signal 1042 and the output 320 of the stop program step comparator 318 as inputs.

Figure 6:
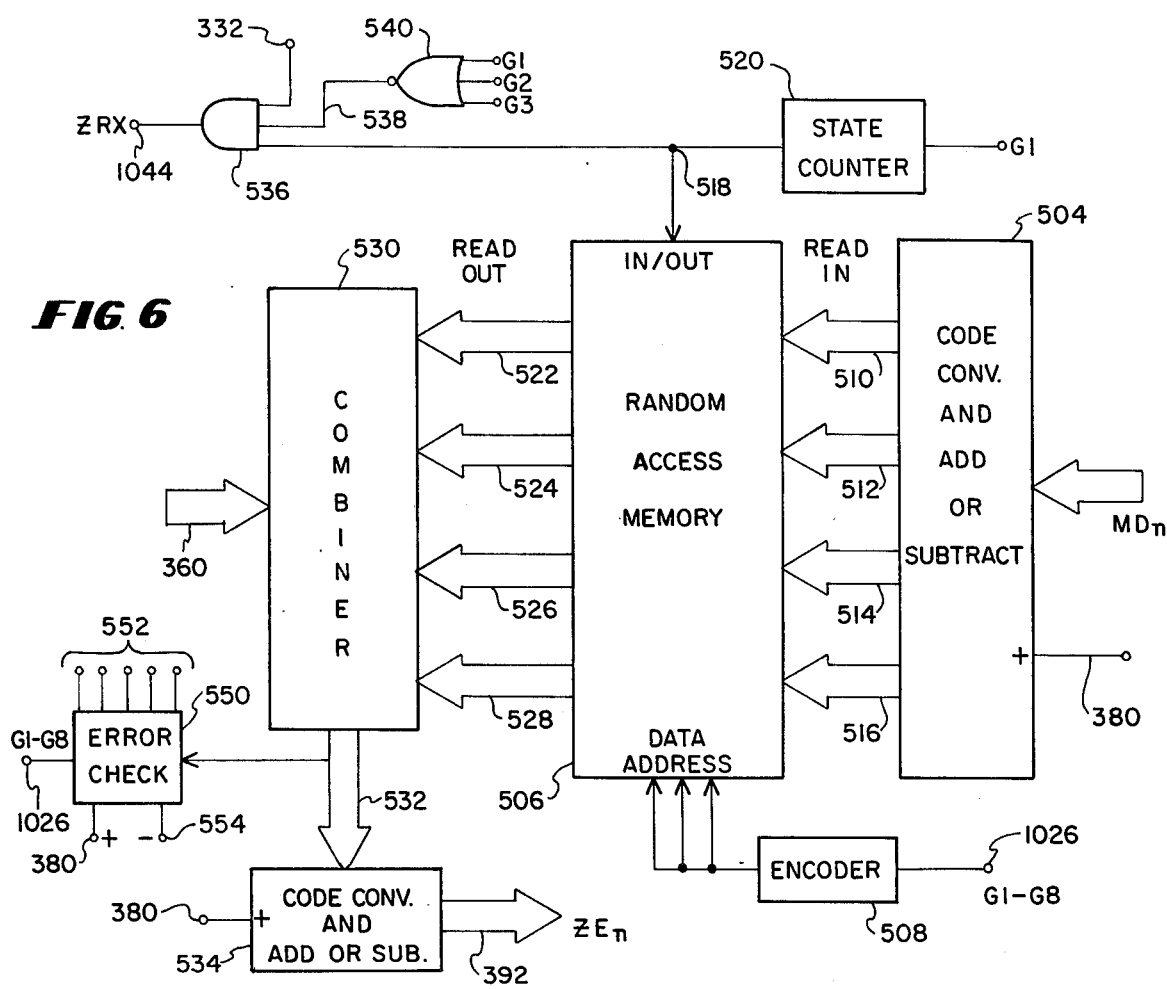
FIG. 6 is a schematic diagram of an alternative embodiment of the real time program modification unit illustrated in FIGS. 2 to 5.

An alternative embodiment to portions of the real time program modification unit 250 of FIG. 4 is shown in FIG. 6 which performs the same overall general data modification function but also performs the complete reading and writing of modified data for all axes in two system scan cycles independent of the number of axes capable of being modified. This is in contrast to the embodiment of FIG. 4 which requires two system scanning cycles for each axis that is capable of being modified or for example, six cycles for three modified axes. The portions of the embodiment in FIG. 4 referred to generally as 500 are the only modifications with the remaining circuitry being unchanged and performing the same function as described previously. Those general stages which are modified within the area 500 are the counter and timing cycle decoder stages with associated gate array and timing stages, the combiner stage 362, register 390 and the write control gate array.

The $MD_n$ data from the memory 1020 is presented in a multiplex format, one axis at a time during the first system scan cycle after the start address step has occurred as discussed previously. The data, $MD_n$, for each axis is converted from Gray code to binary code by converter stage 504 for presentation one axis at a time to the random access memory stage 506. The converter stage 504 also provides a logical complement function through a gate array of exclusive OR gates under the control of the add signal 380, also multiplexed for each axis from the direction modification stage 364, FIG. 4. During the first system scanning cycle, data is read into the random access memory stage 506 and is stored or received for each axis at a specified separate address location as defined by the data address lines of stage 506. The data address lines are provided by an encoder stage 508 which is driven by the system scan signals $G_1$ through $G_8$ identified generally as 1026. The encoder assigns a particular 3-bit code for each scan signal so that the data for each axis is stored according to its corresponding scan cycle position. The multiplexed data is presented to random access memory stage 506 on data bus lines 510, 512, 514 and 516 each of which comprises four data lines. The function of the random access memory stage 506, either reading in or reading out data, is controlled by the data control output 518 of a state counter 520 which is basically a two state counter or flip-flop triggered by the $G_1$ scan signal. The first output state of counter 520 is a read cycle for the entire system scan cycle wherein data is read into random access memory 506 for all axes. The second output state is a write cycle for the next successive entire system scan cycle wherein the stored data is read out of the random access memory on data bus outputs 522, 524, 526 and 528.

As described in detail previously, the modification data representing the desired modification data for each axis as selected on switches 1070 through 1078 is presented in a multiplex format on data bus 360, FIG. 4, to a binary combiner stage 530, operating similarly to the combiner stage 362 of FIG. 4. The combiner 530 provides the resultant combined data on output bus 532, also on a multiplex basis for each axis, representing the modified positional data to be recorded into system memory stage 1020. The modified data is processed through a code converter (binary to Gray) and add or subtract stage 534 with the output 392 representing the modified positional data 392 which is presented for recording into memory 1020.

The write control signal ZRX, identified as 1044, is derived to determine the appropriate write signal cycles by combination in a three input AND gate 536 of the latch gate enabling signal 322, FIG. 4, the output 518 of the state counter 520, and a signal 538 corresponding logically to a portion of the scan cycle assigned to the controlled axes. This latter signal 538 inhibits writing during the auxiliary scan cycle portion, $G_1$ through $G_3$ in this specific embodiment, and is generated by the output of a three input NOR gate 540 with the $G_1$, $G_2$ and $G_3$ scan signals as inputs.

An error check stage 550 is provided to actuate error indicator output states 552 whenever an invalid binary operation has occurred. Such an invalid operation may occur whenever a modification is programmed into unit 250 that would result in either a negative number relative to the encoder programming reference or a number in excess of encoder capacity. The error check stage 550 is provided with the direction signal 380, add, and its inverse 554, subtract, as well as the scan signals $G_1$ through $G_8$, 1026 to determine whether addition or subtration (complementary addition) has been programmed and to determine what axis is being modified and therefore what axis is in error. The most significant digits and carry outputs of the combiner output bus 532 are provided to the error check stage 550 to determine invalid binary results of the modified data. This is accomplished by monitoring the final carry output when a complementary addition (subtraction) modification is programmed indicating a negative result and monitoring the output which is one bit higher than the maximum allowable number capable of being programmed when addition is performed. Addition is programmed when a modification is indicated in the position of increasing magnitude on switches 1080 through 1088 such as "up" in the vertical axes.

The overall system of FIG. 6 is effective during a first complete system scanning cycle to sequentially read the stored data for all axes and temporarily store this data in the random access memory 506. During the next successive complete system scan cycle, the data is sequentially read out of the random access memory 506 and combined with the respective sequentially presented modifying data for each axis and written into memory 1020 for each step identified by the start and stop program address step stages 1060 and 1062. This process continues as described in connection with FIG. 4 until the stop address step is reached. The program modification unit 250 then automatically terminates operation. The stages shown in FIG. 6 are conventional circuits available from Texas Instruments, for example, and specifically random access memory stage 506 may be formed by interconnecting four integrated circuit type numbers SN7489, combiner stage 530 may be formed from four type number SN7483 devices, and encoder stage 508 may comprise a type SN74148 device. As discussed previously, the stages 504 and 534 may be formed by interconnecting in conventional fashion an array of two input exclusive OR gate SN7486 devices.

Figure 7:
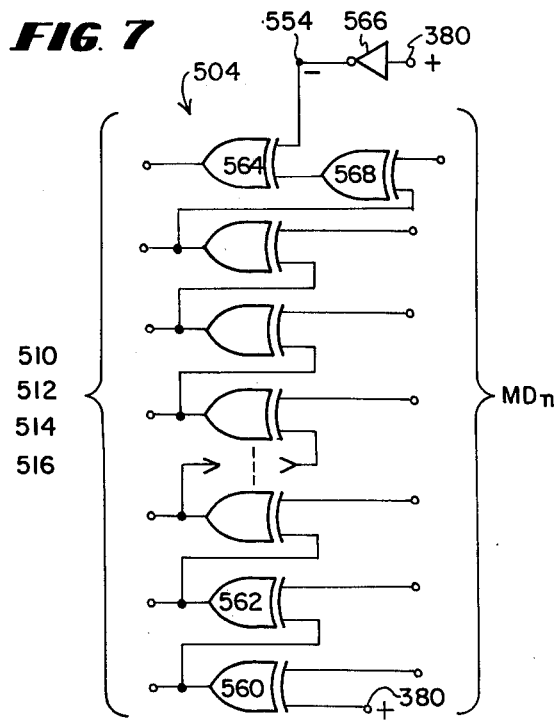
FIG. 7 is a more detailed circuit diagram of the converter stage of FIG. 6.
Figure 8:
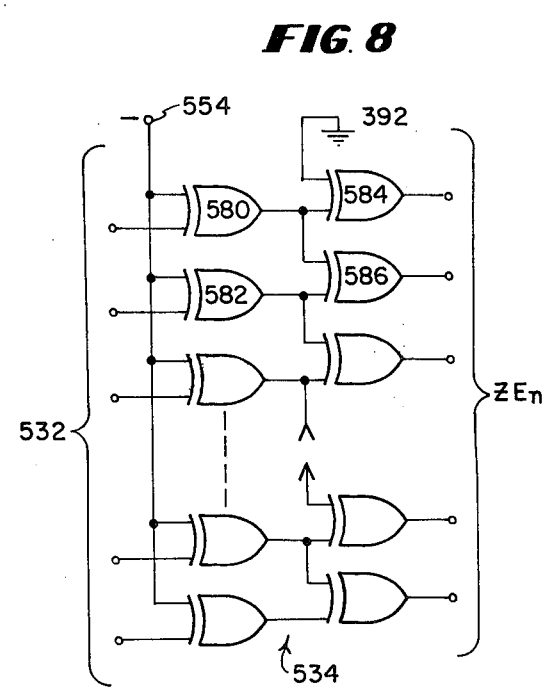
FIG. 8 is a more detailed circuit diagram of the add or subtract stage of FIG. 6.

The generalized details of the circuity in stages 504 and 534 are shown in FIGS. 7 and 8, respectively to illustrate the code conversion and addition or subtraction (complementary addition) as performed by conventional arrays. The combiner 530 merely operates as a conventional full binary adder so that subtraction is performed by complementary addition which is performed with logic circuits taking the complement of the minuend ($MD_n$), adding the subtrahend (modification data) and then taking the complement of the resulting difference. This is achieved by first taking the logical complement of the $MD_n$ data input to the random access memory stage 506 through conversion stage 504 and also taking the logical complement of the binary combined output 532 of combiner 530 when subtraction has been programmed.

The exclusive OR gate array of stage 504 includes one gate for each data line of the $MD_n$ data bus which are arranged with one input of each gate connected to a data line of the $MD_n$ data bus while the second input is connected to the output of the OR gate of the next highest bit line. For example, the OR gate 560 has one input connected to the addition direction signal 380 and the second input connected to the highest bit data line of the $MD_n$ data bus. The output of the OR gate 560 is connected to one input of gate 562 which has the second input connected to the next lowest bit line of the $MD_n$ data bus. The output of gate 560 is the highest binary bit input line to the random access memory 506 while the output of gate 562 is the input line which is one bit lower than the output of gate 560. The remaining intermediate gates are connected in similar fashion with the lowest bit line gate 564 having one input connected to the subtraction signal 554 which is derived from addition line 380 by inverter gate 566. The second input of gate 564 is connected to the output of two input exclusive OR gate 568 which has one input connected to the lowest bit data line and the second input connected to the binary output of the gate of the next highest bit data line. The overall function of stage 504 is to convert the $MD_n$ data from Gray code to binary code and also to logically complement the input data for subtraction (complementary addition). Code converters of this general type to convert binary code to Gray code or Gray code to binary code are generally discussed in *Designing with TTL-Integrated Circuits*, edited by R. L. Morris and J. R. Miller, published by McGraw-Hill Book Company, at pages 133 to 138 and shown in FIGS. 6.37 and 6.39.

Similarly, the stage 534, FIG. 8, first complements the combiner output data 532 for complementary addition (subtraction) and then converts the data from binary code to Gray code at output 392 referred to as $ZE_n$. The stage 534 includes a first array of two input exclusive OR gates to perform the complementary function during subtraction; one gate for each data line of data bus 532. One input of each of the gates is connected to the subtraction direction line 554 while the second input of each gate is connected to a respective data line of the data bus output 532. For example, gates 580 and 582 each have one input connected to the subtraction signal line 554. Gate 580 has the second input connected to the highest or most significant output bit line of data bus 532 while gate 582 has the second input connected to the next lowermost significant bit line. A second array of two output exclusive OR gates is arranged to perform the binary to Gray code conversion with one input of gate 584 connected to the output of gate 580 and the second input connected to ground or a logical low level. The output of gate 580 is also connected to ine input of gate 586 with the second input connected to the output of gate 582. The output of gate 584 is the highest or most significant bit line of the data bus $ZE_n$ of modified data in Gray code format while the output of gate 586 is the next lowermost significant bit output. The remaining gates in the second code conversion array are connected in similar fashion.

While the embodiments of FIGS. 4 through 8 have been illustrated wherein all the axes included the same number of data bits of information, it should be understood that several of the axes may include a lower number of bits of information. In that case, suitable modification of the data according to conventional logic design would be necessary in the gate arrays of stages 504 and 534 as well as the error check stage 550 to properly shift and combine the data.

As an alternative, the real time program modification unit as shown in FIGS. 4 and 6 may include counter stages in the comparators 306 and 318 to count WSP step address signals to obtain the address identity $A_n$ rather than monitor the $A_n$ signal directly.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator, the combination of:
   a manipulator arm;
   means for moving said arm to different positions in a plurality of different axes;
   memory storage means for storing digital command signal representations corresponding to different positions of said arm in said axes;
   means controlled by said stored command signals for moving said arm to said different positions during a playback cycle;
   means for modifying at least one of said particular stored command signals in said memory storage means according to preselected data corresponding to positional modifications in direction and magnitude relative to said stored digital representations, said modifying means being operative to change said stored command signals during the same playback cycle in which said arm moving means is also controlled by at least one unmodified one of said stored command signals.

2. The combination of claim 1 wherein said combining means further comprises multiplex gating means controlled by said repetitive multiplex scanning cycle for providing said position modification data for each of said axes during said respective multiplex scan locations to said combining means.

3. The method of modifying the programming of a manipulator provided with an arm which is movable in a plurality of axes and having encoder means for said axes operative to develop position signals corresponding to the actual position of said arm in said plurality of axes, which comprises the steps of:
   storing a plurality of said position signals corresponding to different positions of said arm in said axes in a predetermined sequence and address location;
   recalling said stored position signals in a sequential fashion to control said arm to perform a repetitive work cycle;
   identifying at least one of said stored position signals by said address location at which said arm position is to be modified; and
   modifying said identified stored position signal during the operation of said work cycle by preselected data corresponding to a positional modification in direction and magnitude.

4. In a programmable manipulator, the combination of:
   a manipulator arm movable in a plurality of axes;
   memory storage means having stored therein a plurality of digital command signals corresponding to the program step position to which said arm is to be moved;
   address means for causing said stored command signals to appear at the output of said memory means in a predetermined sequence;
   means for moving said arm to the positions represented by said stored command signals;
   means for modifying said stored command signals during the operation of said programmable manipulator in at least one preselected program step and according to preselected data corresponding to positional modifications in direction and magnitude relative to said stored command signals;
   means for identifying a particular series of successive program steps each of which is to be modified by said preselected positional modification data; and
   means for comparing said first and last steps in said series of steps to said program step position to control said modification of stored command signals.

5. In a programmable manipulator, the combination of:
   a manipulator arm movable in a plurality of axes;
   memory storage means having stored therein a plurality of digital command signals corresponding to the program step position to which said arm is to be moved;
   address means for causing said stored command signals to appear at the output of said memory means in a predetermined sequence;
   means for moving said arm to the position represented by said stored command signals;
   means common to all of said axes for modifying said stored command signals in at least one preselected program step while said arm is being moved by said arm moving means and according to preselected data corresponding to positional modifications in direction and magnitude relative to said stored command signals; said stored command signals being read out during different periods in a repetitive multiplex scanning cycle;
   said modifying means further comprising means for combining said stored command signals and said positional modification data for each of said axes during said respective periods in said repetitive multiplex scanning cycle.

6. The combination of claim 5 wherein said modifying means further comprises means for combining said stored command signals and said preselected modification data wherein each of said modifications is accomplished for each axis sequentially in a predetermined order.

7. The combination of claim 6 wherein said modifying means further comprises means for transferring said combined modified data into said memory storage means at the same program step location as said stored command signal which was modified to form a modified stored command signal.

8. The combination of claim 7 wherein said combining means further comprises:

first digital means for complementing the multiplexed command signals for an axis at a particular program step to be modified when said positional modification data for an axis is in a first predetermined direction relative to said command signal for said axis, said complementing means passing the command signal for an axis unchanged when said positional modification data is in a second predetermined direction;

temporary memory means for storing said command signals or complemented command signals from said digital complementing means for a particular program step to be modified, said command signals or complemented command signals being presented to and stored in said temporary storage means during said respective periods in a first repetitive multiplex scanning cycle, said stored command signals or complemented command signals being read out of said temporary storage means during a second successive repetitive multiplex scanning cycle;

means for multiplexing said positional modification data for presentation in a format corresponding to said repetitive scanning cycle;

means for adding said command signal read out of said temporary memory means and said multiplexed positional modification data for each respective axis during respective scan periods of said second scanning cycle to form modified data in said multiplex scanning cycle format; and second digital means for complementing said modified data when said positional modification data for an axis is in said first predetermined direction and passing said modified data unchanged when said positional modification data is in said second direction, said modified data or complemented modified data being transferred into said memory storage means by said transferring means to form said modified stored command signal.

9. The combination of claim 8 further comprising means for detecting error in the selection of positional modification, said error detecting means responsive to said modified data output of said adding means and effective to determine if a modified data output is either less than or greater than the permissible value of command signals for each of said axes.

10. In a programmable manipulator, the combination of:

a manipulator arm;

means for moving said arm to different positions in a plurality of different axes;

memory storage means for storing digital command signal representations corresponding to different positions of said arm in said axes;

means for modifying at least one of said particular stored command signals in said memory storage means during the operation of said programmable manipulator according to preselected data corresponding to positional modifications in direction and magnitude relative to said stored digital representations;

means for identifying the particular digital command signal representation to be modified;

means for inputting said particular digital command signal representation to be modified;

means for inputting said preselected positional modification data;

means for combining said digital command position representations and said positional modification data to produce a modified positional digital output representing the desired modified position;

means common to said axes for comparing said stored digital command signals and said positional signal representations and developing an error signal related to the difference therebetween, means for sequentially connecting said comparing means to different command and position signal combinations corresponding to movement in different ones of said axes during different periods in a repetitive multiplex scanning cycle, said modifying means further comprising means responsive to said sequential connecting means for developing timing control signals to sequentially control the successive modification of stored data in each of said axes during said multiplex scanning cycle by controlling the combining means to combine the stored digital command signals and the modification positional data during the respective scan period of said multiplex scanning cycle corresponding to a particular axis; and means for writing said combined modified data into said memory storage means.

11. The combination of claim 10 wherein said writing means writes said combined modified data into said memory storage means during the scan period corresponding to said respective axis being modified of the next successive repetitive scanning cycle to said combining scanning cycle for said respective axis being modified.

12. The combination of claim 11 wherein said sequential combining and writing process during successive multiplex scanning cycles is repeated for each axis to be modified and wherein the combining of data is performed for a second axis in the next successive repetitive scanning cycle to the cycle in which the writing of modified data was performed for said first axis.

13. The combination of claim 10 wherein said combining of data and writing into said memory storage means is accomplished for all axes during a single multiplex scanning cycle, said combining and writing process occurring during a single scan period of said scanning cycle for each respective axis.

14. The combination of claim 10 wherein said combining means includes a mode input to control said combining means to add said modification data to said digital command signal representations when said mode input is a first predetermined logic stage and to subtract said modification data from said digital command signal representation when said mode input is a second predetermined logic state.

15. In a programmable manipulator, the combination of:

a manipulator arm;

means for moving said arm to different positions in a plurality of different axes;

memory storage means for storing digital command signal representations corresponding to different positions of said arm in said axis;

means for developing a position signal representing the position of said arm in each of said axis;

means for modifying at least one of said particular stored digital representations in said memory storage means during the operation of said programmable manipulator according to preselected data corresponding to positional modifications in direction and magnitude relative to said stored digital representations;

said memory storage means being sequentially advanced in address steps through said different stored command signals; and said modifying means further comprising start step address means for comparing the storage address location of said different stored command signals to a first preselected address location to control said modifying means to start said modification of stored positional data.

16. The combination of claim 15 wherein said modifying means further comprises stop step address means for comparing the storage address location of said different stored command signals to a second preselected address location to control said modifying means to stop said modification of stored positional data.

17. Apparatus for modifying a selected program step or program steps during the operation of a programmable manipulator according to preselected positional modification data, the programmable manipulator including a manipulator arm movable in a plurality of axes, memory storage means having stored therein a plurality of digital command signals corresponding to the program step position to which said arm is to be moved, address circuitry for causing the stored command signals to appear at the output of said memory means in a predetermined sequence and means for moving said arm to the position represented by said stored command signals, said modifying apparatus being common to all axes and comprising:

means for identifying the particular digital command signal representation to be modified;

means for inputting said particular digital command signal to be modified;

means for combining said inputted digital command representation and said positional modification data to produce a modified positional digital output representing the desired modified position;

means for controlling the writing of said modified positional output data into said memory storage means at the same address location as said inputted command signal;

each of said stored command signals being read out during different predetermined periods in a repetitive multiplex scanning cycle, said modifying apparatus further comprising means for providing said positional modification data for each of said axes during said respective multiplex scan periods in said scan cycle to said combining means; and means for controlling said combining means to combine said stored command signals and said positional modification data for each of said axes during said respective scan periods in said repetitive multiplex scanning cycle, each of said modifications being accomplished for each axis sequentially in a predetermined order.

18. The combination of claim 17 wherein said writing means writes said modified data into said memory storage apparatus during the scan period corresponding to said respective axis being modified of the next successive scanning cycle to said combining scanning cycle.

19. The combination of claim 18 wherein said sequential combining and writing process during successive multiplex scanning cycles is repeated for each axis to be modified and wherein the combining of data is performed for a second axis in the next successive repetitive scanning cycle to the cycle in which the writing of modified data was performed for a first axis.

20. The combination of claim 17 wherein said combining of data and writing into said memory storage means is accomplished for all axes during a single multiplex scanning cycle, said combining and writing process occurring during a single scan period of said scanning cycle for each respective axis.

21. In a programmable manipulator, the combination of:

a manipulator arm movable in a plurality of axes;

memory storage means;

teach control means for controlling movement of said manipulator arm during an initial teaching mode so that said arm is successively moved to a series of positions corresponding to a desired three-dimensional path of movement and recording in said memory storage means a plurality of digital command signals corresponding to said series of positions to which said arm is moved;

address means for causing said stored command signals to appear at the output of said memory means as successive program steps corresponding to said series of positions during a subsequent playback mode;

means for moving said arm successively to the positions represented by said stored command signals; and means operable independently of said teach control means and while said arm is being moved by said arm moving means during one of said subsequent playback modes for modifying said stored command signals in at least one preselected program step and according to preselected data corresponding to positional modifications in direction and magnitude relative to said stored command signals.

22. The combination of claim 21 wherein said modifying means further comprises means for identifying a particular series of successive program steps to be modified by said preselected positional modification data, and means for comparing said first and last steps in said series of steps to said program step position to control said modification of stored command signals.

23. The combination of claim 21 wherein said stored command signals are modified by the same preselected data at a plurality of program steps.

24. The combination of claim 21, which includes means for indicating when said modification of stored command signals has been completed.

25. In a programmable manipulator, the combination of, a manipulator arm movable in a plurality of axes, memory storage means having stored therein a plurality of digital command signals corresponding to different positions to which said arm is to be moved during a playback cycle of said manipulator, means for moving said arm to the positions represented by said stored command signals, and means operative during a playback cycle for modifying at least one of said stored command signals by a preselected increment of movement in at least one of said axes, whereby said manipulator arm is moved to a position corresponding to said modified command signal during succeeding playback cycles.

26. In a programmable manipulator, the combination of, a manipulator arm movable in a plurality of axes, memory storage means having stored therein a plurality of digital command signals correspondng to different positions to which said arm is to be moved during a playback cycle of said manipulator, means for moving said arm to the positions represented by said stored command signals, means for establishing a desired increment of movement in one of said axes; address means for causing said stored command signals to appear at the output of said memory in a predetermined sequence, means for identifying a series of successive command signals each of which is to be changed by said desired increment of movement, and means jointly responsive to said address means and said identifying means for generating a series of modified command signals which differ from the original command signals in said series by said desired increment.

27. The combination of claim 26, wherein said jointly responsive means is initially disabled, and means for enabling said jointly responsive means after said desired increment of movement has been established and said series of command signals has been identified.

28. The combination of claim 26, wherein said increment establishing means includes a manually adjustable member which is movable to different positions corresponding to different increments of desired movement in said one axis.

29. The combination of claim 26, wherein said increment establishing means includes a plurality of independently adjustable members one for each axis in which movement is to be modified, each of said members being movable to different positions corresponding to different increments of desired movement in the corresponding axis.

30. The combination of claim 26, wherein said identifying means includes first and second members each of which is adjustable to different positions corresponding to the command signals in said predetermined sequence, said jointly responsive means being controlled in accordance with the settings of said first and second members to develop said series of modified command signals.

31. The combination of claim 30, which includes means for indicating that said generation of said series of modified command signals has been completed.

32. The combination of claim 26, which includes means for storing said series of modified command signals in said memory storage means for use during succeeding playback cycles.

33. The combination of claim 29, which includes a plurality of direction establishing members individually associated with said movable members and each actuatable to two positions corresponding to a desired direction of said increment of movement in each of said axes.

34. In a programmable manipulator, the combination of, a manipulator arm movable in a plurality of axes, memory storage means having stored therein a plurality of digital command signals corresponding to different positions to which said arm is to be moved during a playback cycle of said manipulator, means for identifying a series of said command signals, and means controlled by said identifying means for modifying each of the command signals in said series by the same desired increment of movement in at least one of said axes.

35. The combination of claim 34, which includes means for storing said modified command signals in said memory storage means.

36. The combination of claim 35, wherein said modified command signals are storing at the same addresses as the original command signals in said memory storage means.

37. The combination of claim 34, wherein said identifying means includes first and second members each of which is adjustable to different positions corresponding to different ones of said stored command signals, and means for controlling said command signal modifying means in accordance with the settings of said first and second members.

38. The combination of claim 34, which includes means for developing first and second digital control signals corresponding to the settings of said first and second members, and means for controlling said command signal modifying means in accordance with said first and second control signals.

* * * * *